Aug. 15, 1933.   E. V. COULSTON   1,922,419
ACCESSORY FOR COOKING VESSELS
Filed Feb. 17, 1932
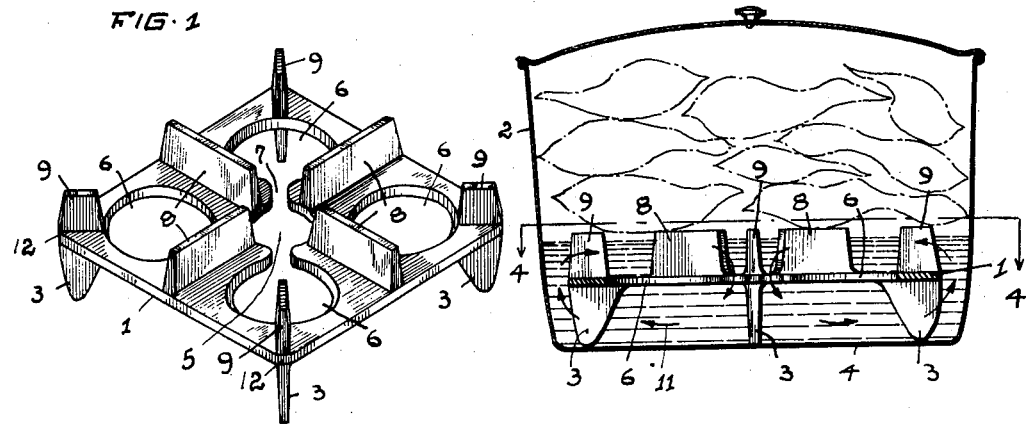
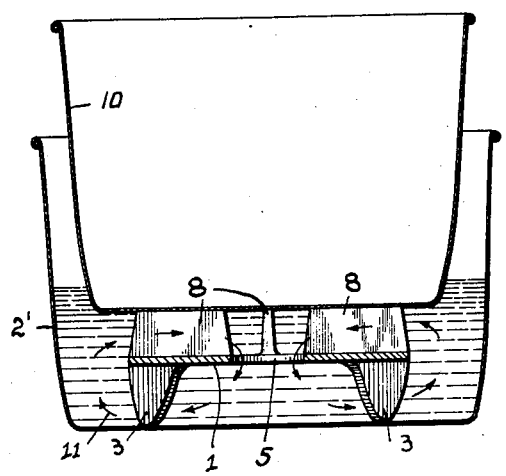
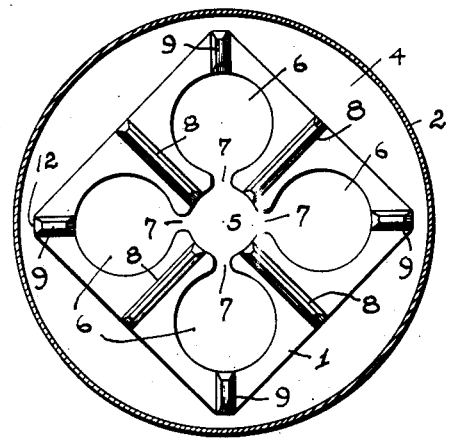
INVENTOR
EARL V. COULSTON
BY
ATTORNEY Patented Aug. 15, 1933

1,922,419

UNITED STATES PATENT OFFICE 1,922,419

ACCESSORY FOR COOKING VESSELS

Earl V. Coulston, Cleveland, Ohio

Application February 17, 1932. Serial No. 593,591

4 Claims. (Cl. 53—1)

This invention relates to accessories for cooking vessels and has for its general object to provide a cheap and efficient device for use with cooking vessels which prevents easily scorchable foods from becoming scorched.

A further object of the invention is to provide a grid like member adapted for insertion within an ordinary cooking pot or vessel adapted for supporting either articles of food or a second cooking vessel in spaced relation with respect to the bottom of the first cooking vessel.

A further object of the invention is to provide efficient means whereby articles of food may be steam cooked in an ordinary sauce pan, thus eliminating the necessity of using expensive sectional boilers for this purpose.

Other and further objects of the invention will be apparent from the description and accompanying drawing, in which:

Figure 1 is a top perspective view of the invention;

Figure 2 is a side elevation partly in section showing one application of the invention to steam cooking purposes;

Figure 3 is a side elevation partly in section showing a modified use of the invention, and Fig. 4 is a sectional view on line 4—4 of Fig. 2.

Referring more particularly to the drawing 1 denotes an angular substantially flat plate of cast aluminum construction adapted for insertion in an ordinary sauce pan or other cooking vessel 2. While the plate may contact with the sides of the sauce pan at isolated points, such as corners 12, without objectionable results, it is desirable that the sides of the plate be remote from the cooking vessel so as to insure a free flow or circulation of heating water. Legs 3, support the plate 1 upon and spaced from the bottom 4 of the vessel 2, and these legs are preferably shaped to cause minimum displacement of water on the bottom of the vessel.

Plate 1 is formed with a central opening 5 and a plurality of larger preferably round openings 6, for snugly receiving and supporting eggs and other round objects in upright position. Openings 6 communicate with opening 5 through slots 7 radiating from opening 5, and each opening 6 is segregated from the next adjacent opening 6, except for such means of communication, by ribs or lugs 8. These ribs, which radiate from the central opening 5 of the plate 1, to the side edges of the latter and also extend between adjacent openings 6, serve to support articles of food or a vessel containing food above the top of the plate. They also cooperate with the openings 5 and 6 in effecting free circulation of water, in a manner presently explained. If deemed desirable any additional number of suitably placed smaller lugs or ribs 9, may be employed, as additional seating and spacing supports.

Where the device is to be employed for steam cooking sweet potatoes, cabbage and other foods which are improved if cooked without direct contact with water, the level of water will be slightly below the top edges of the ribs 8 and 9, as indicated by dotted lines in Figure 2 of the drawing. For double boiler usage, the level of the water in vessel 2' will of course be sufficiently high to completely submerge the plate 1 and its upstanding ribs, (see dotted line in Figure 3) and of course a second sauce pan or vessel 10 for holding the food to be cooked will be inserted within the larger pan 2', with its bottom in contact with the ribs of plate 1.

In practice the plate or member 1 is placed within and upon the bottom of an ordinary cooking vessel and the latter placed upon a gas or other stove. Water is then added until its level rises above the top surface of the plate, and in the case of steam cooking, below the top of the ribs or projections 8 and 9. The second sauce pan 10 containing food to be cooked, or the food to be steamed is then placed on top of plate 1, according to the use to which the device is to be put. When placed on a gas stove the water in cooking vessel 2 or 2', as the case may be, naturally heats faster at or adjacent the sloping side walls of the vessel than at other points, it follows that the hottest water flows up the sides of the vessel, across the upper side or face of plate 1 through the well defined channels or spaces defined by radially disposed flanges or ribs 8 and thence down through the central opening 5 and outwardly and upwardly along the sides of the cooking vessel, thus completing the cycle. The direction of flow just described is clearly illustrated by the arrows 11 in Figures 2 and 3 of the drawing. Where the device is used for cooking on a coal stove, or similar hot surfaces, the circulation would be reversed, since in such case the center of the bottom of the vessel would be heated more quickly than the portions adjacent the side walls. In either case the heat will be distributed to the vessel walls or the food direct with greater evenness and less ebullition than would be the case should the plate 1 be eliminated.

What I claim is:

1. An accessory for use with conventional cooking vesels, a plate having projections adapted to space said plate from the bottom of such vessel, said plate having an opening adjacent its central portion and a series of openings including said first opening, and raised portions on the top of said plate intermediate said openings encircling said first opening, said portions forming channels extending from the outer edges of said plate to a point adjacent said first opening.

2. The combination of a round cooking vessel with a grid like accessory placed within said vessel and comprising an angular plate, having supporting members on its under side for spacing said plate from the bottom of said vessel, and raised projections on the top face of said plate forming channels extending from the central portion of said plate to the edges thereof, said plate having an opening in said central portion communicating with said channels.

3. An accessory for use with conventional cooking vessels, a plate having members adapted to support the plate spaced from the bottom of a cooking vessel, said plate having a relatively small central opening therein, a plurality of larger openings communicating with said central opening, converging raised portions on the top of said plate forming channels partially enclosing said larger openings and terminating at their inner ends adjacent said central opening.

4. The combination of a round cooking vessel with an accessory placed into said vessel and comprising a substantially flat square-shaped plate having symmetrically arranged supports on one side thereof for spacing the bottom of the plate from the bottom of the cooking vessel, said plate having a central opening therein, and a series of raised portions radially and symmetrically extending from the outer edges of said plate toward said opening for forming a series of channels converging toward said opening and said plate including a series of symmetrically arranged openings encircling said first opening and arranged between said raised portions.

EARL V. COULSTON.